(12) United States Patent
Munshi et al.

(10) Patent No.: US 10,035,865 B2
(45) Date of Patent: Jul. 31, 2018

(54) PREPARATION OF CHLORINATED POLYVINYL CHLORIDE

(71) Applicant: RELIANCE INDUSTRIES LIMITED, Mumbai, Maharashtra (IN)

(72) Inventors: Pradip Munshi, Vadodara (IN); Jayesh Prafullachandra Vora, Mumbai (IN); Ninad Deepak Ingle, Pune (IN); Pradeep Paresh Kapadia, Mumbai (IN); Raksh Vir Jasra, Vadodara (IN); Shashikant Rajan, Kalyanpur (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 15/326,810

(22) PCT Filed: Jul. 21, 2015

(86) PCT No.: PCT/IB2015/055514
§ 371 (c)(1),
(2) Date: Jan. 17, 2017

(87) PCT Pub. No.: WO2016/012939
PCT Pub. Date: Jan. 28, 2016

(65) Prior Publication Data
US 2017/0198067 A1 Jul. 13, 2017

(30) Foreign Application Priority Data

Jul. 22, 2014 (IN) .................................... 2365/2014

(51) Int. Cl.
*C08F 8/22* (2006.01)
*C08J 7/12* (2006.01)

(52) U.S. Cl.
CPC .................. *C08F 8/22* (2013.01); *C08J 7/126* (2013.01); *C08J 2327/06* (2013.01)

(58) Field of Classification Search
CPC .................................. C08F 8/22; C08F 14/06
See application file for complete search history.

(56) References Cited

U.S. PATENT DOCUMENTS

| 2,890,213 | A | | 6/1959 | Noeske | |
| 3,663,392 | A | * | 5/1972 | Zeitler | ...................... C08F 8/20 522/132 |

FOREIGN PATENT DOCUMENTS

KR 2012-0087480 A 8/2012

OTHER PUBLICATIONS

Bassiouni, Polymer, 40 (1999) p. 1903-1909 (Year: 1999).*
International Search Report and Written Opinion of the ISA for PCT/IB2015/055514, ISA/Indian Patent Office, New Delhi, dated Dec. 28, 2015.

* cited by examiner

*Primary Examiner* — Robert C Boyle
(74) *Attorney, Agent, or Firm* — Harness, Dickey & Pierce, P.L.C.

(57) ABSTRACT

The present disclosure relates to a process for the preparation of CPVC which includes reacting PVC with chlorine at a pre-determined temperature in the presence of at least one irradiation source having wavelength ranging from 254 and 530 nm while maintaining the radiant flux from 1.5 to 2 W/kg of PVC, irradiance at 0.13 W/cm$^2$ and the number of photons emitted per second from $3 \times 10^{18}$ to $5 \times 10^{18}$, under agitation, for a time period ranging from 3 to 4 hours to obtain CPVC. The CPVC prepared from the afore-stated process has a whiteness index ranging from 89 to 96, a yellowness index ranging from 1.23 to 1.73 and stability ranging from 648 to 684 seconds. The rate of the chlorination reaction after employing the afore-stated process parameters ranges from 1.6 to 4.36 mole/hour/kg.

5 Claims, No Drawings

PREPARATION OF CHLORINATED POLYVINYL CHLORIDE

CROSS-REFERENCE TO RELATED APPLICATIONS

This application is a 371 U.S. National Stage of International Application No. PCT/IB2015/055514, filed Jul. 21, 2015, which application claims the benefit of and priority to Indian Patent Application No. 2365/MUM/2014, filed Jul. 22, 2014. The disclosures of the above applications are incorporated herein by reference.

FIELD

The present disclosure relates to the preparation of chlorinated polyvinyl chloride.

BACKGROUND

Chlorinated polyvinyl chloride (CPVC) is a thermoplastic polymer prepared by chlorinating polyvinyl chloride (PVC) resin. As CPVC contains more amount of chlorine as compared to PVC, the former is more tolerant to wider temperature ranges and demonstrates improved resiliency in terms of conveying both hot and cold materials. Consequently, CPVC has a wide range of industrial applications including pipes used for hot and cold water distribution in residential and industrial use, transportation of corrosive liquids, high tension cable protection pipes and the like.

CPVC is typically prepared by the chlorination of PVC by means of a photo-chemical reaction. The photo-chemical reaction is initiated by an irradiation source, wherein the photons emitted from the source decompose the chlorine gas to generate free radicals of chlorine which upon reacting with PVC replace a portion of the hydrogen in the PVC with chlorine to yield CPVC.

Preparation of CPVC with improved properties such as thermal stability, colour and inherent viscosity necessitates a specific grade of PVC as the starting material, for instance, PVC with higher porosity, higher inherent viscosity, higher thermal stability and lower yellowness index. However, procuring PVC having the afore-stated properties results in a higher running cost of the operation. Furthermore, the CPVC that results from such an expensive means is often vulnerable to decomposition and outwardly defects mostly arising due to a longer time of reaction and certain mutations in the form of double bonds, conjugation of double bolds or unsaturations.

A need is therefore felt for developing a process for preparation of CPVC which mitigates the afore-stated drawbacks.

OBJECTS

Some of the objects of the present disclosure, of which at least one embodiment is adapted to provide, are described herein below:

It is an object of the present disclosure to provide a process for the preparation of CPVC.

It is another object of the present disclosure to provide a process for the preparation of CPVC which is cost and time effective.

It is yet another object of the present disclosure to provide CPVC.

It is still another object of the present disclosure to provide CPVC having desirable properties such as whiteness index, yellowness index and thermal stability.

It is still another object of the present disclosure to ameliorate one or more problems of the conventional processes or to at least provide a useful alternative.

Other objects and advantages of the present disclosure will be more apparent from the following description which is not intended to limit the scope of the present disclosure.

SUMMARY

The present disclosure provides a process for the preparation of CPVC comprising reacting PVC with chlorine at a pre-determined temperature in the presence of at least one irradiation source having wavelength ranging from 254 and 530 nm while maintaining the radiant flux from 1.5 to 2 W/kg of PVC, irradiance at 0.13 W/cm$^2$ and the number of photons emitted per second from $3\times10^{18}$ to $5\times10^{18}$, under agitation, for a time period ranging from 3 to 4 hours to obtain CPVC. The CPVC prepared from the afore-stated process has a whiteness index ranging from 89 to 96, a yellowness index ranging from 1.23 to 1.73 and stability ranging from 648 to 684 seconds. Typically, the rate of the chlorination reaction after employing the afore-stated process parameters ranges from 1.6 to 4.36 mole/hour/kg.

DETAILED DESCRIPTION

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present disclosure provides a process for the preparation of CPVC having desirable properties such as whiteness index, yellowness index and thermal stability. Furthermore, the process is such that it does not necessitate use of a specific standard of PVC as the starting material which is generally expensive.

The process includes reacting PVC with chlorine at a pre-determined temperature in the presence of at least one irradiation source having wavelength ranging from 254 and 530 nm while maintaining the radiant flux from 1.5 to 2 W/kg of PVC, irradiance at 0.13 W/cm$^2$ and the number of photons emitted per second from $3\times10^{18}$ to $5\times10^{18}$, under agitation, for a time period ranging from 3 to 4 hours to obtain CPVC.

Typically, the porosity of the PVC used in the present process ranges from 0.26 to 0.28 ml/g. Further, the PVC may be in a completely dried form or in slurry form. PVC in a completely dried form is characterized by 0.2 to 1% loss on heating at 70° C. for 2 hours whereas PVC in slurry form typically has a concentration ranging from 10 to 30% w/v. The pre-determined temperature ranges from 50 to 90° C. and in one embodiment is 70° C.

In one embodiment, light-emitting diodes (LEDs) are used as the irradiation source in the present process. However, light sources such as ultra violet (UV) lamps and LASERs may also be used in the present process. The inventors of the present application have found that any type of narrow spectral band width source may be used as the irradiation source in the present process. In one embodiment, the apparatus where the present process is carried out is a tubular assembly surrounded by a series of small irradiating devices having wavelength ranging from 254 and 530 nm and emitting radiation covering an angle in the range of 15 to 140°, preferably the covering angle is in the range of 50 to 80°. The electricity consumed by the irradiation source is in the range 10 mW to 1 W, preferably in the range of 20 to 40 mW. The operating expenses are reduced as the electricity consumption in accordance with the present disclosure is low. The apparatus takes less space as compared to conventional irradiating devices with longer wavelengths.

As is known in the art, chlorination of PVC is initiated by the photons breaking the chlorine molecular bond and creating a chlorine radical. The chlorine radical removes the hydrogen from C—H and creates a carbon radical. The carbon radical binds with chlorine and gets chlorinated. The process of creating chlorine radical and chlorinating carbon radical is repeated.

While not being bound by any particular theory, it is believed that an irradiation source having a shorter wavelength has a higher energy and therefore it emits more number of photons. When such a source is used in the present reaction, cessation of the Cl—Cl bond is greater generating more chlorine radicals. Thus, more irradiance (the power emitted by a source per unit area) will generate more chlorine radicals. Excess chlorine radicals will either recombine (making the cessation redundant) or create more carbon radicals, which may lead to the formation of undesired byproducts. It is, therefore, preferred that the irradiance is kept at a minimum level. The wavelength is also so adjusted that the energy released is minimum or at a level which is required to break optimum Cl—Cl bonds. The radiant flux (the total power emitted by a source) is another factor which is directly proportional to the number of photons released. Therefore, it is necessary to maintain the level of irradiance, radiant flux, and the number of photons to a minimum level in order to obtain a higher reaction rate and a better quality product. Radiant flux and irradiance are thus the important parameters to be considered in a photo-reactor design for optimum distribution of light and consequently for efficient chlorination.

In view of the afore-stated, the inventors of the present disclosure found that when the present process is carried out at a radiant flux of 1.5 to 2 W/kg of PVC, irradiance of 0.13 W/cm$^2$ and the number of photons emitted per second from $3\times10^{18}$ to $5\times10^{18}$, the CPVC that is formed has a Whiteness Index ranging from 89 to 96, a Yellowness Index ranging from 1.23 to 1.73 and stability ranging from 648 to 684 seconds at 210° C. The Whiteness Index (WI) and the Yellowness Index (YI) are the two color parameters to judge CPVC product quality. Higher values of WI and lower values of YI indicate better product quality whereas lower values of WI and higher values of YI indicate poor quality of product. Furthermore, the rate of the reaction ranges from 1.6 to 4.36 mole/hour/kg. As a virtue of maintaining the radiant flux, irradiance and no. of photons in the afore-stated ranges; it is not essential that the PVC, which is used as the starting material, should be of a specific high standard; thereby limiting the OPEX.

The present disclosure provides a process for the photo-chlorination of PVC at a minimum radiant flux as well as at minimum irradiance. The photo-chlorination reaction is carried out with less number of photons per second and in a shorter time period. Since the reaction is carried out over a shorter time period, the chlorinated PVC has improved thermal stability when compared with conventionally prepared chlorinated PVC.

The present disclosure is further described in light of the experiments provided herein below which are set forth for illustration purpose only and not to be construed for limiting the scope of the disclosure. These laboratory scale experiments can be scaled up to industrial/commercial scale.

EXAMPLE 1

Preparation of CPVC Using K 67 PVC 630 g of K 67 PVC with porosity 0.26 mL/g was taken in a 5 L glass reactor in which 4 L of water was added to obtain aqueous PVC slurry. The glass reactor was equipped with a light-emitting diode (LED) rated at 410 nm wavelength. The irradiation source was a tubular assembly surrounded by a series of small irradiating devices. Each irradiating device emitted radiation covering an angle of 60° and consumed 2.5 W of electricity such that the radiant flux remained nearly 1.5 W and the irradiance remained nearly 0.13 W/cm$^2$. The emitting photon number was $3.0\times10^{18}$/sec.

The slurry was agitated at 800 rpm and simultaneously nitrogen gas was purged inside the reactor through the slurry. The temperature of the slurry was maintained at 70° C. Nitrogen was stopped after 30 minutes and chlorine was purged through the slurry maintaining the same conditions.

Irradiation was switched on when the slurry and the reactor head space were saturated by chlorine. The starting of irradiation was considered as the reaction start time. The progress of the reaction was monitored periodically by titrating proportional amount of mother liquor against 0.1 N NaOH. The reaction was stopped at the titer value corresponding to 67% chlorination (by weight) of PVC by switching off the irradiation. Nitrogen purging was continued for 1 hour to expel out residual chlorine from the mixture. The resulting CPVC slurry was filtered and washed with water till the pH showed litmus neutral. The wet cake that resulted from the filtering was dried under reduced pressure at 55° C. for 2 hours. The dried CPVC powder was further neutralized by using 0.0125(N) Ca(OH)$_2$ at 10 mL/g of CPVC for 10 minutes. Filtration followed by washing (25 mL/g CPVC dry basis) after neutralization gave CPVC which was finally dried under at 70° C. for 3 hours.

% chlorine content (by weight) was checked by using the method as per reference: IS-15778-2007. Calculation was executed by using formula: % Chlorine in CPVC=[102.9−46.2(A/B)] where A=weight of PVC in gram, B=weight of CPVC obtained in gram. The chorine present in A gram PVC was considered 0.567 A gram. The result was obtained within ±0.5%. The thermal stability (sec) of resin was measured by conductivity meter using PVC thermomat (Metrohm 895), as per DIN53381, ISO 182-3 at 210° C.

Result: The chlorine content at 3.6 hours of reaction was 67.34% (by wt), the whiteness index was 96, the yellowness index was 1.23 and the thermal stability by conductivity was 648 sec at 210° C.

EXAMPLE 2

Preparation of CPVC Using K 57 PVC 630 g of K 57 PVC with porosity 0.27 mL/g was taken in a 5 L glass reactor in which 4 L of water was added to obtain aqueous PVC slurry. The glass reactor was equipped with a LED rated at 410 nm wavelength. The irradiation source was a tubular assembly surrounded by a series of small irradiating devices. Each irradiating device emitted radiation covering an angle of 60° and consumed 2.5 W of electricity such that the radiant flux remained nearly 1.5 W and the irradiance remained nearly 0.13 W/cm$^2$. The emitting photon number was $3.0 \times 10^{18}$/sec.

The slurry was agitated at 800 rpm and simultaneously nitrogen gas was purged inside the reactor through the slurry. The temperature of the slurry was maintained at 70° C. Nitrogen was stopped after 30 minutes and chlorine was purged through the slurry maintaining the same conditions.

Irradiation was switched on when the slurry and the reactor head space were saturated by chlorine. The starting of irradiation was considered as the reaction start time. The progress of the reaction was monitored periodically by titrating proportional amount of mother liquor against 0.1 N NaOH. The reaction was stopped at the titer value corresponding to 67% chlorination (by weight) of PVC by switching off the irradiation. Nitrogen purging was continued for 1 hour to expel out residual chlorine from the mixture. The resulting CPVC slurry was filtered and washed with water till the pH showed litmus neutral. The wet cake that resulted from the filtering was dried under reduced pressure at 55° C. for 2 hours. The dried CPVC powder was further neutralized by using 0.0125(N) Ca(OH)$_2$ at 10 mL/g of CPVC for 10 minutes. Filtration followed by washing (25 mL/g CPVC dry basis) after neutralization gave CPVC which was finally dried under at 70° C. for 3 hours.

% chlorine content (by weight) was checked by using the method as per reference: IS-15778-2007. Calculation was executed by using formula: % Chlorine in CPVC=[102.9−46.2(A/B)] where A=weight of PVC in gram, B=weight of CPVC obtained in gram. The chorine present in A gram PVC was considered 0.567 A gram. The result was obtained within ±0.5%. The thermal stability (sec) of resin was measured by conductivity meter using PVC thermomat (Metrohm 895), as per DIN53381, ISO 182-3 at 210° C.

Result: The chlorine content at 3.0 hours of reaction was 67.34% (by wt), the whiteness index was 92, the yellowness index was 1.69 and the thermal stability by conductivity was 684 sec at 210° C.

A series of optimization trials were carried out by the inventors of the present disclosure out of which Examples 1 and 2 (Trial 7 and 10 respectively) are the trials that gave the best results. A compilation of all the trials with their results are provided herein below in the form of Table 1.

TABLE 1

Optimization of the process of the present disclosure

| Trial No. | PVC type | Porosity of PVC (mL/g) | Energy of photons (kJ/mol) | Radiation emittance | Radiant flux (W) | Irradiance (W/cm$^2$) | Photon no./sec | Chlorine content (%) | Time (h) | Whiteness index | Yellowness index | Thermal stability (sec) |
|---|---|---|---|---|---|---|---|---|---|---|---|---|
| 1 | K67 | 0.23 | 226 | Continuous | 5.8 | 0.34 | $1.2 \times 10^{19}$ | 67.4 | 5.5 | 82.39 | 3.05 | 396 |
| 2 | K67 | 0.23 | 226 | Continuous | 1.7 | 0.1 | $1.2 \times 10^{19}$ | 67.34 | 4.5 | 85.41 | 2.95 | 504 |
| 3 | K67 | 0.23 | 226 | Continuous | 1.7 | 0.2 | $1.2 \times 10^{19}$ | 67.37 | 4.25 | 85 | 3.12 | 504 |
| 4 | K67 | 0.23 | 226 | Continuous | 1.08 | 0.06 | $1.2 \times 10^{19}$ | 67.37 | 4 | 87 | 2.37 | 540 |
| 5 | K67 | 0.23 | 226 | Continuous | 5.8 | 0.34 | $4.89 \times 10^{18}$ | 67.3 | 4 | 88 | 2.35 | 612 |
| 6 | K67 | 0.23 | 226 | Continuous | 2 | 0.13 | $4.89 \times 10^{18}$ | 67.32 | 4 | 89 | 2.15 | 612 |
| 7 | K67 | 0.26 | 226 | Continuous | 1.5 | 0.13 | $3.0 \times 10^{18}$ | 67.34 | 3.6 | 96 | 1.23 | 648 |
| 8 | K67 | 0.26 | 226 | Continuous | 2 | 0.13 | $4.89 \times 10^{18}$ | 67.45 | 3.5 | 89 | 1.73 | 648 |
| 9 | K67 | 0.28 | 226 | Continuous | 2 | 0.13 | $4.89 \times 10^{18}$ | 67.4 | 3 | 89 | 1.73 | 648 |
| 10 | K57 | 0.27 | 226 | Continuous | 1.5 | 0.13 | $3.0 \times 10^{18}$ | 67.34 | 3 | 92 | 1.69 | 684 |
| 11 | K57 | 0.27 | 226 | Continuous | 2 | 0.13 | $4.89 \times 10^{18}$ | 67.34 | 3 | 89.32 | 1.71 | 684 |
| 12 | K67 | 0.23 | 226 | Continuous | 1.08 | 0.06 | $5.8 \times 10^{18}$ | 67.32 | 5 | 87.2 | 2.94 | 540 |
| 13 | K67 | 0.23 | 226 | Continuous | 1.08 | 0.06 | $1.2 \times 10^{18}$ | 67.32 | 4.5 | 88.2 | 2.95 | 540 |
| 14 | K67 | 0.23 | 226 | Continuous | 1.08 | 0.06 | $1.2 \times 10^{19}$ | 67.32 | 5 | 85.2 | 3.19 | 486 |
| 15 | K67 | 0.23 | 226 | intermittent: on off 2 secs | 1.08 | 0.06 | $1.2 \times 10^{19}$ | 67.33 | 6 | 87 | 2.9 | 468 |

Inference:

From the afore-stated table it is clear that when the radiant flux, the irradiance and the no. of photons emitted per second is less, the WI is greater, the YI is lesser and the stability is greater. The time required for the completion of the reaction is also lesser. Trials 7-11 show that when the radiant flux is maintained from 1.5 to 2 W/kg of PVC, irradiance at 0.13 W/cm$^2$ and the number of photons emitted per second from $3 \times 10^{18}$ to $5 \times 10^{18}$, the reaction gets completed in 3 to 4 hours and the resulting CPVC shows a whiteness index ranging from 89 to 96, a yellowness index ranging from 1.23 to 1.73 and stability ranging from 648 to 684 seconds.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

Technical Advantages and Economic Significance

The present disclosure provides a simple and economic process for the preparation of CPVC.

The present disclosure provides a process for the preparation of CPVC which takes place in a shorter time period.

The present disclosure provides CPVC having desirable thermal stability and color.

The invention claimed is:

1. A process for the preparation of chlorinated polyvinyl chloride (CPVC) comprising reacting polyvinyl chloride (PVC) with chlorine at a pre-determined temperature in the presence of at least one irradiation source having wavelength ranging from 254 and 530 nm while maintaining the radiant flux from 1.5 to 2 W/kg of PVC, irradiance at 0.13 W/cm$^2$ and the number of photons emitted per second from $3\times10^{18}$ to $5\times10^{18}$, under agitation, for a time period ranging from 3 to 4 hours to obtain CPVC, said obtained CPVC being characterized by a whiteness index ranging from 89 to 96, a yellowness index ranging from 1.23 to 1.73 and thermal stability at 210° C. ranging from 648 to 684 seconds.

2. The process as claimed in claim 1, wherein said PVC is in at least one form selected from the group consisting of PVC in completely dried form characterized by 0.2 to 1% loss on heating at 70° C. for 2 hours and PVC in slurry form having concentration ranging from 10 to 30% w/v.

3. The process as claimed in claim 1, wherein the porosity of said PVC ranges from 0.26 to 0.28 ml/g.

4. The process as claimed in claim 1, wherein said irradiation source is a narrow spectral band width source having a wavelength in the range of 254 to 530 nm.

5. The process as claimed in claim 1, wherein said pre-determined temperature ranges from 50 to 90° C.

* * * * *